US011922158B2

(12) United States Patent
Toren et al.

(10) Patent No.: US 11,922,158 B2
(45) Date of Patent: Mar. 5, 2024

(54) UNIFIED LOCAL PATCH REPOSITORY

(71) Applicant: Intigua, Inc., Boston, MA (US)

(72) Inventors: Shai Toren, Alonei Abba (IL); Yair Regev, Givatayim (IL)

(73) Assignee: INTIGUA, INC., Boston, MA (US)

(*) Notice: Subject to any disclaimer, the term of this patent is extended or adjusted under 35 U.S.C. 154(b) by 0 days.

(21) Appl. No.: 17/455,864

(22) Filed: Nov. 19, 2021

(65) Prior Publication Data

US 2022/0413828 A1 Dec. 29, 2022

Related U.S. Application Data

(60) Provisional application No. 63/202,838, filed on Jun. 25, 2021.

(51) Int. Cl.
*G06F 8/65* (2018.01)
*G06F 8/71* (2018.01)
*G06F 9/50* (2006.01)

(52) U.S. Cl.
CPC .............. *G06F 8/65* (2013.01); *G06F 8/71* (2013.01); *G06F 9/505* (2013.01); *G06F 9/5077* (2013.01)

(58) Field of Classification Search
CPC ... G06F 8/65; G06F 8/71; G06F 9/505; G06F 9/5077
See application file for complete search history.

(56) References Cited

U.S. PATENT DOCUMENTS

| 7,627,866 B2* | 12/2009 | Bunker ..................... G06F 8/65 717/166 |
| 7,650,392 B1* | 1/2010 | Goodwin ................ H04L 67/02 709/219 |
| 9,465,953 B2* | 10/2016 | Sharma ................. H04L 9/0822 |
| 10,860,303 B2* | 12/2020 | Sirois ....................... G06F 8/65 |
| 11,100,064 B2* | 8/2021 | Dwarampudi .......... G06F 8/656 |
| 11,669,321 B2* | 6/2023 | Srinivasan ............ G06F 16/212 717/169 |
| 2007/0208782 A1* | 9/2007 | Carter ...................... G06F 8/65 |

(Continued)

FOREIGN PATENT DOCUMENTS

| CN | 103202018 B * | 5/2016 | .......... H04N 19/132 |
| EP | 3798877 A1 * | 3/2021 | ............. G06F 21/44 |
| WO | WO-2022262754 A1 * | 12/2022 | |

OTHER PUBLICATIONS

Ozga et al. "A practical approach for updating an integrity-enforced operating system", 2020, ACM (Year: 2020).*

(Continued)

*Primary Examiner* — Wei Y Zhen
*Assistant Examiner* — Junchun Wu
(74) *Attorney, Agent, or Firm* — Reches Patents

(57) ABSTRACT

A method for software patching, the method may include determining to expose at least one patch of a version of an operating system to one or more computers located outside a unified local path repository (ULPR) hosted by a computer; and exposing, for period of time and by the ULPR, a selected logical computer that stores the at least one patch. The selected logical computer is selected out of multiple logical computers of the ULPR. Different logical computers of the multiple logical computers store operating systems that differ from each other by at least one of identity and version.

15 Claims, 6 Drawing Sheets

(56) References Cited

U.S. PATENT DOCUMENTS

| | | | |
|---|---|---|---|
| 2008/0163192 A1* | 7/2008 | Jha | G06F 8/65 |
| | | | 717/173 |
| 2014/0282472 A1* | 9/2014 | Vinograd | G06F 8/63 |
| | | | 717/170 |
| 2016/0103673 A1* | 4/2016 | Curran | G06F 8/658 |
| | | | 717/168 |
| 2021/0096956 A1* | 4/2021 | O'Dell | G06F 11/1464 |
| 2022/0021606 A1* | 1/2022 | Kaplan | H04L 45/18 |
| 2022/0413828 A1* | 12/2022 | Toren | G06F 8/71 |

OTHER PUBLICATIONS

Lamba, "Analysing Sanitization Technique of Reverse Proxy Framework for Enhancing Database-Security", 2014, ijics.com (Year: 2014).*

Zanjani et al., "Automatically Recommending Peer Reviewers in Modern Code Review", 2015, IEEE (Year: 2015).*

Wang et al., "FUSION: A Unified Application Model for Virtual Mobile Infrastructure", 2017, IEEE (Year: 2017).*

* cited by examiner

UNIFIED LOCAL PATCH REPOSITORY

BACKGROUND

In computer science, A patch is a set of changes to a computer program or its supporting data designed to update, fix, or improve it. This includes fixing security vulnerabilities and other bugs, with such patches usually being called bug-fixes or bug fixes. Patches are often written to improve the functionality, usability, or performance of a program.

Patches may be installed either under programmed control or by a human programmer using an editing tool or a debugger and many other tools. They may be applied to program files on a storage device, firmware, or in computer memory.

Patching makes possible the modification of compiled and machine language object programs when the source code is unavailable. This demands a thorough understanding of the inner workings of the object code by the person creating the patch, which is difficult without close study of the source code. Someone unfamiliar with the program being patched may install a patch using a patch utility created by another person who is the Admin. Even when the source code is available, patching makes possible the installation of small changes to the object program without the need to recompile or reassemble. For minor changes to software, it is often easier and more economical to distribute patches to users rather than redistributing a newly recompiled or reassembled program.

Although meant to fix problems, poorly designed patches can sometimes introduce new problems (see software regressions). In some special cases updates may knowingly break the functionality or disable a device, for instance, by removing components for which the update provider is no longer licensed.

Patch management is a part of lifecycle management, and is the process of using a strategy and plan of what patches should be applied to which systems at a specified time. (www.wikipedia.org).

A Local patch repository is a computer that caches software patches intended either for the OS (Operating System) or other types of applications, or middleware or network devices or any other device that runs software by retrieving the patches from the operating system or other application vendor's dedicated website, storing them locally on the computer's disk and exposing them to other computers for retrieval using Web like retrieval interfaces.

At present, each vendor OS local repository doesn't allow other types of repositories to co-exist with it (on the same computer), not even with the same OS type and different major versions.

In computerized environments (for example data centers) that support multiple OSs and/or multiple different versions of one or more OS—a dedicated computer/computers/servers are required for each OS version—which may amount to a waste of computing resources and networking resources (hostname/Internet Protocol Address), a waste of space and an increase in maintenance operations and power consumption or cost if this is hosted on a cloud instance.

SUMMARY

Figure 1:
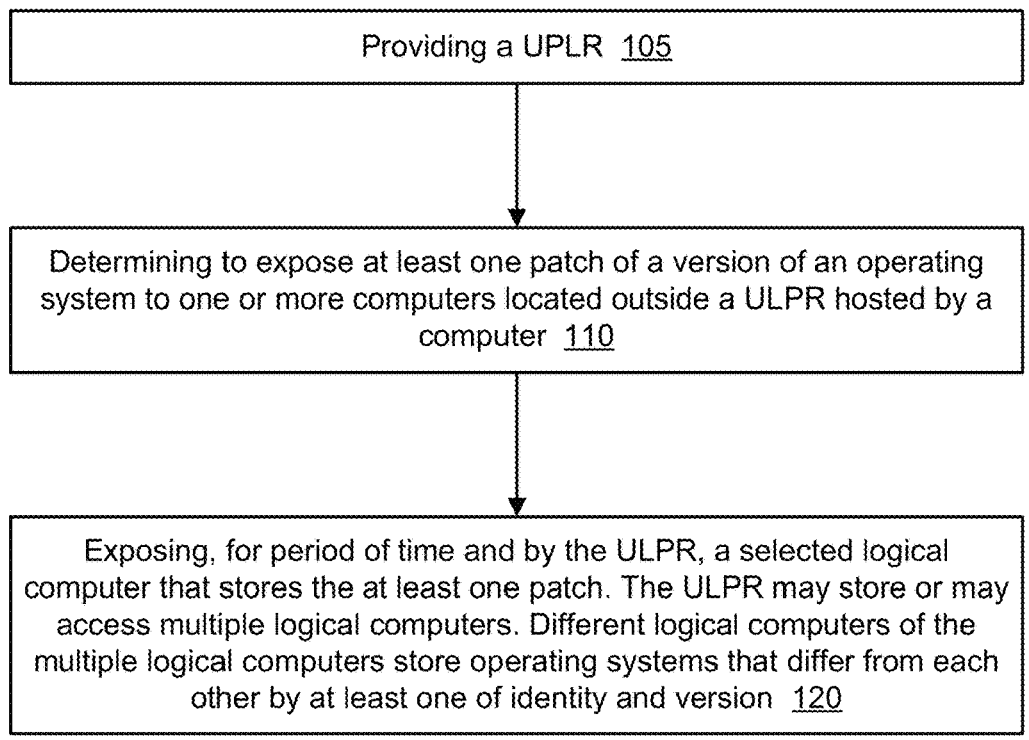
FIG. 1 illustrates an example of a method.

There may be provided a method, system and non-transitory computer readable medium for a Unified Local Patch Repository (ULPR).

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

There may be provided a method, system and a non-transitory computer readable medium for Unified Local Patch Repository (UPLR).

The objective of the ULPR is to allow the sharing of computing resources and networking resources, resulting in a reduction of both initial setup/configuration as well as resources costs/time and on-going MW costs.

This is achieved by allocating each Local Patch Repository (LPR) separately on a dedicated logical computing resource but at the same time on shared physical computing resources. The shared physical or virtual computing resources may be, for example, one or more servers or one or more computers.

These logical resources aka LPRs each running on a logical computer represent patches libraries. While the prior art solution requires a dedicated physical or virtual machine—the suggested solution may require only a fraction (for example half) of the resources used by the prior art solution. For example—the current solution required a fraction (for example half) of the CPU and/or memory (for example RAM) of the CPU and/or memory in comparison to the prior art solution.

The current solution also requires much less (for example 20% less) disk space (storage), as running a full OS for each computer is not required. The saving is even more dramatic for the IP address Hostnames—in the prior art solution an IP address/Hostname is required for every local patch repository whereas in the current solution only one IP address/Hostname is required.

On-going maintenance and operational costs are saved as direct result of the less physical computing resources required by this solution.

The ULPR uses built-in routing rules to route incoming client requests for specific OS Type/Version patch retrieval to the correct logical computing resources that hold the dedicated patches library. As an example, if a request is made to retrieve Centos 7 OS base patches, the ULPR routes the request to the LPR in charge of Centos 7 OS base patches. The client is informed about the built-in routing rules in order to send an accurate request to access a desired LPR. For example—the request may include a predefined address and an indication of the desired LPR (for example OS and version of the OS).

In order to save resources, especially in cloud based resources (but also in physical data-centers), it is possible to deallocate compute resources for such times specific or all ULPRs resources are not required for the purpose of saving costs (expenditure/energy) and saving networks bandwidths.

The solution is composed of a set of logical computers; each logical computer runs a specific OS type and version and as such each logical computer serves as a LPR for its OS type and version.

There is provided a Reverse Proxy (or any other entity that maps a request to an LPR address or location) running on another logical computer that serves as the entry point to all incoming client requests. The reverse proxy is assigned with the client facing Internet Protocol (IP) egress address (HOST-IP) and hostname, allowing the client endpoints to communicate with it. The reverse proxy builds (or receives) internal routing rules to each LPR logical computer based on one or more logical resources exposed by each LPR logical computer. Examples for these URLs are:

Example Endpoint URL of Repositories to be Configured on Client Machines (Different and more URLs can be defined based on the actual available LPRs)

Centos 6
   http://<HOST-IP>/centos6/base/
   http://<HOST-IP>/centos6/centosplus/
   http://<HOST-IP>/centos6/extras/
   http://<HOST-IP>/centos6/updates/

Centos 7
   http://<HOST-IP>/centos7/repos/base/
   http://<HOST-IP>/centos7/repos/centosplus/
   http://<HOST-IP>/centos7/repos/extras/
   http://<HOST-IP>/centos7/repos/updates/

Centos 8
   http://<HOST-IP>/centos8/centos/8/x86_64/baseos/
   http://<HOST-IP>/centos8/centos/8/x86_64/appstream/
   http://<HOST-IP>/centos8/centos/8/x86_64/extras/

RHEL 7
   http://<HOST-IP>/rhel7/main/
   http://<HOST-IP>/rhel7/server/
   http://<HOST-IP>/rhel7/rhscl/

RHEL 8
   http://<HOST-IP>/rhel8/baseOS/
   http://<HOST-IP>/rhel8/AppStream/

Ubuntu 18.04
   http://<HOST-IP>/ubuntu18/mirror/
   http://<HOST-IP>/ubuntu18/skel/
   http://<HOST-IP>/ubuntu18/var/

Ubuntu 20.04
   http://<HOST-IP>/ubuntu20/mirror/
   http://<HOST-IP>/ubuntu20/skel/
   http://<HOST-IP>/ubuntu20/var/

For the purpose of building a URL request to retrieve patches from a certain patch library, the client computers knows the Reverse Proxy egress IP address and the name of desired patches library.

There is also provided a management entity such as a management layer in charge of loading and unloading the various logical computers using two modes: either by pre-set schedules when to load/unload specific LPRs or using a second mode of sensing in run time the required LPRs and loading it upon request. For example—if the management layer senses that a request is made to a specific OS type/version it will load the dedicated LPR logical computer that can handle such request for a pre-set time period (e.g 2 hours).

The management layer may also supports various maintenance operations like stopping, starting, cleaning up all or specific LPR logical computers.

The solution may also include a setup component in charge of installing the ULPR and setting-up the dedicated LPR logical computers. For the purpose of saving bandwidth and disk resources, the setup component may download the specific chosen LPR logical computer images required to build the LPR logical computer from the vendor's website instead of pre-packaging all LPR images into an installation file or downloading all images all the time.

FIG. 1 illustrates method 100 for software patching.

Method 100 may include step 105 of providing a UPLR.

Step 105 may include installing the ULR and/or setting up the UPLR.

Step 105 may include updating UPLR. The updating may be executed before executing steps 110 and/or 120, but may be executed even after executing at least one instance of steps 110 and/or 120—to allow updates of the UPLR over time.

Method 100 may also include step 110 of determining to expose at least one patch of a version of an operating system to one or more computers located outside a unified local path repository (ULPR) hosted by a computer.

The determining may be made based on (or responsive to) a request, recommendation or command received by the ULPR, a schedule of patching operations, based on a prediction of patching requirements, or made based on any triggering event.

The determining can be made by a management entity of the ULPR.

The request, recommendation or command received by the ULPR can be made by a management entity located outside the ULPR, can be made by any other entity (human or computerized) outside the ULPR.

The request recommendation or command may include an egress address of the ULPR and a hostname associated with the selected logical computer. The host name may identifies the operations system and version.

The request, recommendation or command may be received by a reverse proxy of the ULPR.

The determining may be based on the hostname.

Step 110 may be followed by step 120 of exposing, for period of time and by the ULPR, a selected logical computer that stores the at least one patch.

The ULPR may store or may access multiple logical computers. Different logical computers of the multiple logical computers store operating systems that differ from each other by at least one of identity and version.

For example—different versions of Cent os may be stored at different virtual computers, different versions of REHL may be stored at different virtual computers, different versions of Ubuntu may be stored at different virtual computers, and the like.

The exposing may include providing access to the selected logical computer, loading the selected logical computer to a memory region that is exposed to the one or more computers, outputting the selected logical computer, and the like.

The exposing may be for a period of time that may be determined in any manner.

Step 120 may be followed by another iteration of steps 110 and 120. Alternatively—step 110 may be executed one or more to determine a plurality of exposures of a plurality of logical computers.

Figure 2:
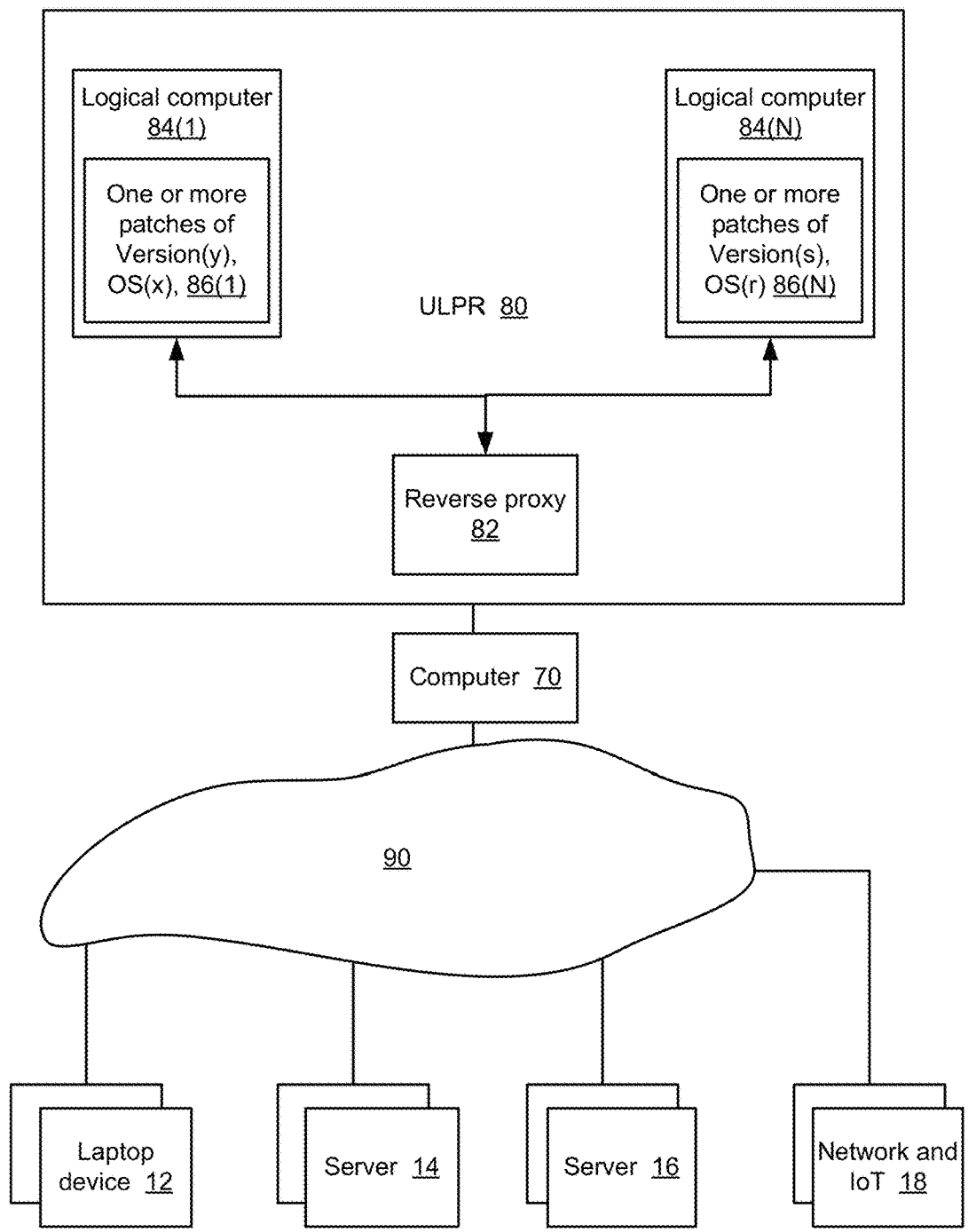
FIG. 2 illustrates an example of a ULPR and its environment.

FIG. 2 illustrates a ULPR 80 and one or more computers.

The one or more computers are illustrates as being different types of computers—laptop devices 12, servers 14, personal computers (PC), networks and Internet of Things (IoT) devices 16. Any computer of any type—mobile, static, wearable, and the like may be serviced by the ULPR 80. It should be noted that the ULPR 80 may service only one type of computer or any number of types of computers. Any network may be used to communicate between the ULPR and any computer serviced by the ULPR.

The ULPR 80 is hosted by computer 70—although it may be hosted by more than a single computer.

The ULPR is illustrated as including reverse proxy 82 and multiple (N) logical computers (LPRs) 84(1)-84(N)—each stores one or more patches for a unique combination of OS and version—86(1)-86(N). N may be an integer that exceeds one. For example—one or more patches of version (y) of OS(x) are denoted 86(1) and are stored in logical computer 84(1), while one or more patches of version (s) of OS(r), are denoted 86(N) and are stored in logical computer 84(N).

Figure 3:
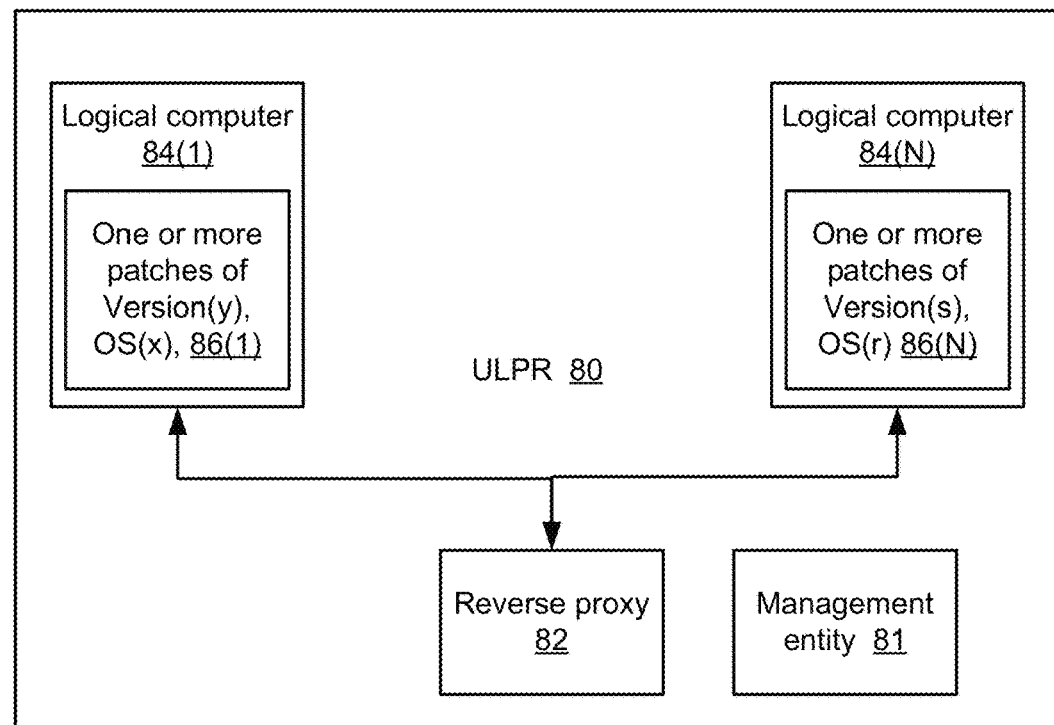
FIG. 3 illustrates an example of a ULPR and its environment.

FIG. 3 illustrates UPLR as including a management entity 81.

The management entity may control the patching operations, may schedule the patching operations, and the like. The management entity may control the exposure by applying access control to the selected logical computer.

Figure 4:
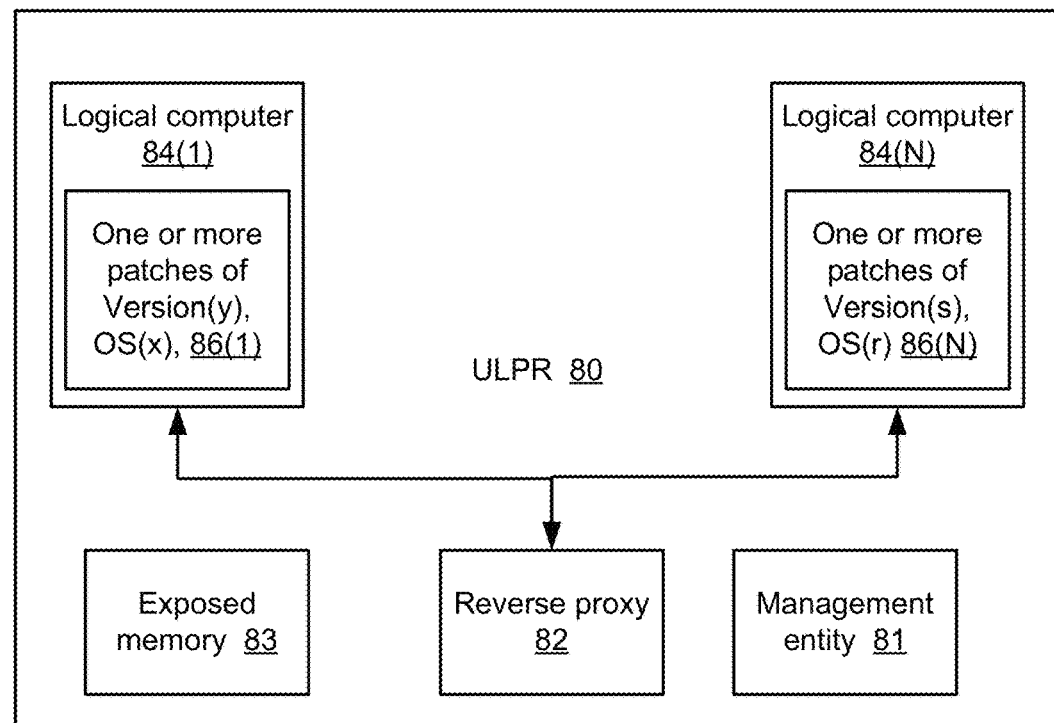
FIG. 4 illustrates an example of a ULPR and its environment.
Figure 4:
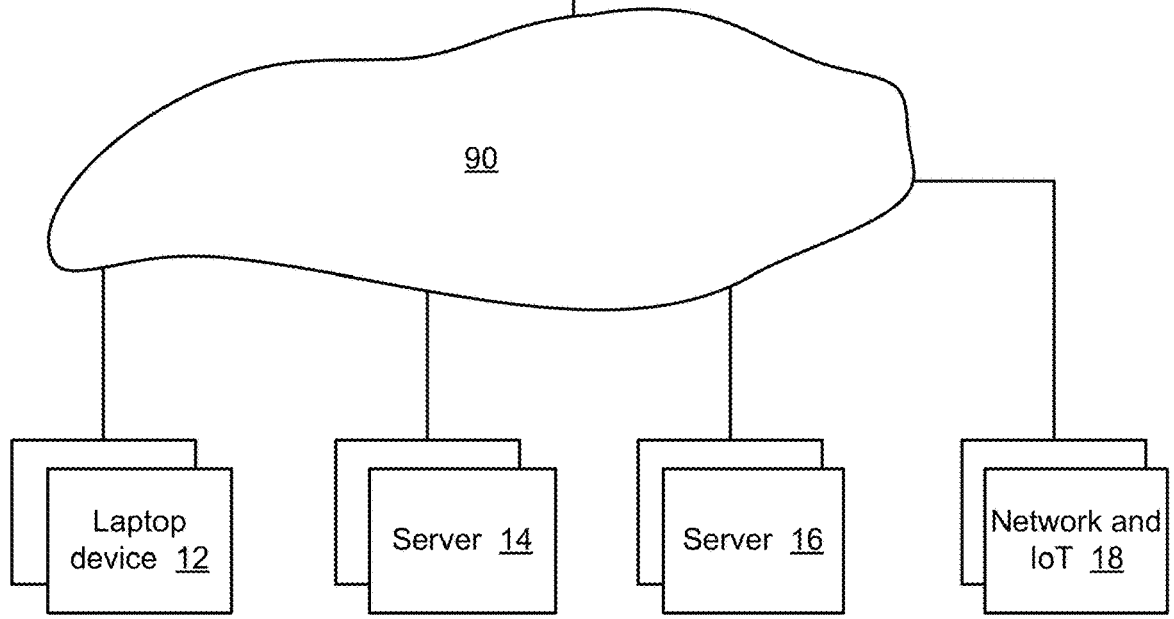

FIG. 4 illustrates UPLR 80 as including management entity 81 and exposed memory 83. The memory is referred to as "exposed memory" because it may store a patch that may be exposed, under the control of the ULPR to one or more computers located outside the ULPR. In this case the exposing of a version of an operating system includes loading the selected logical computer that stores one or more patches for the version of an operating system to the exposed memory 83.

Figure 5:
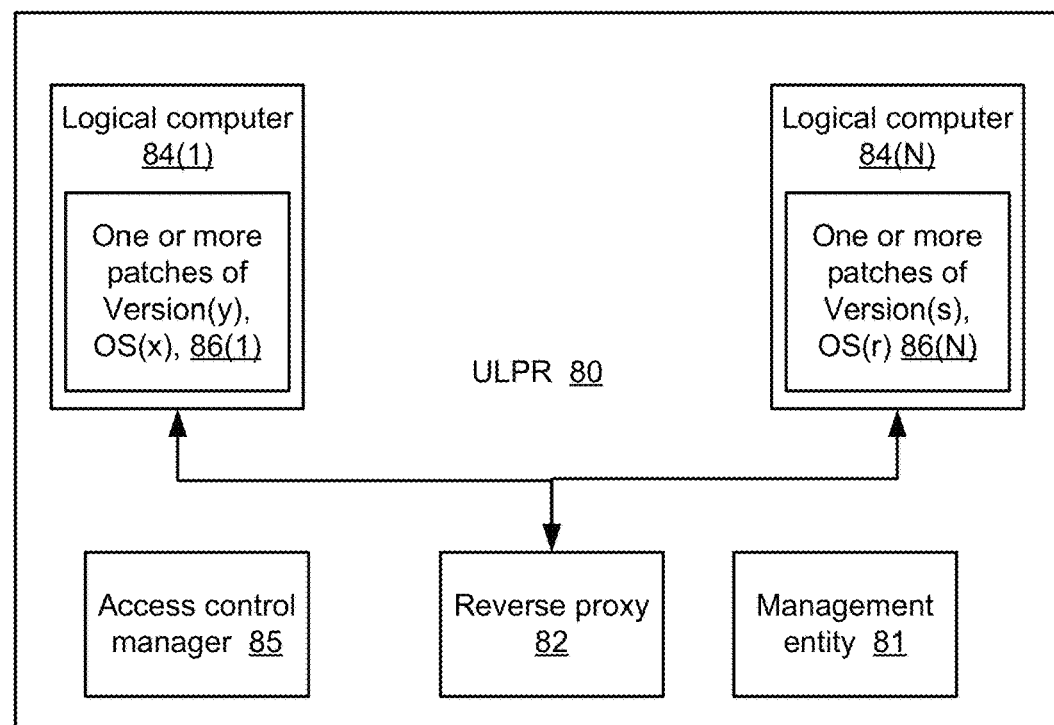
FIG. 5 illustrates an example of a ULPR and its environment.

FIG. 5 illustrate UPLR 80 as including an access control manager 85. The access control manager 85 controls the access to the exposed selected logical computer.

It should be noted that there may be provided multiple UPLRs, each may store or include multiple logical computers.

Figure 6:
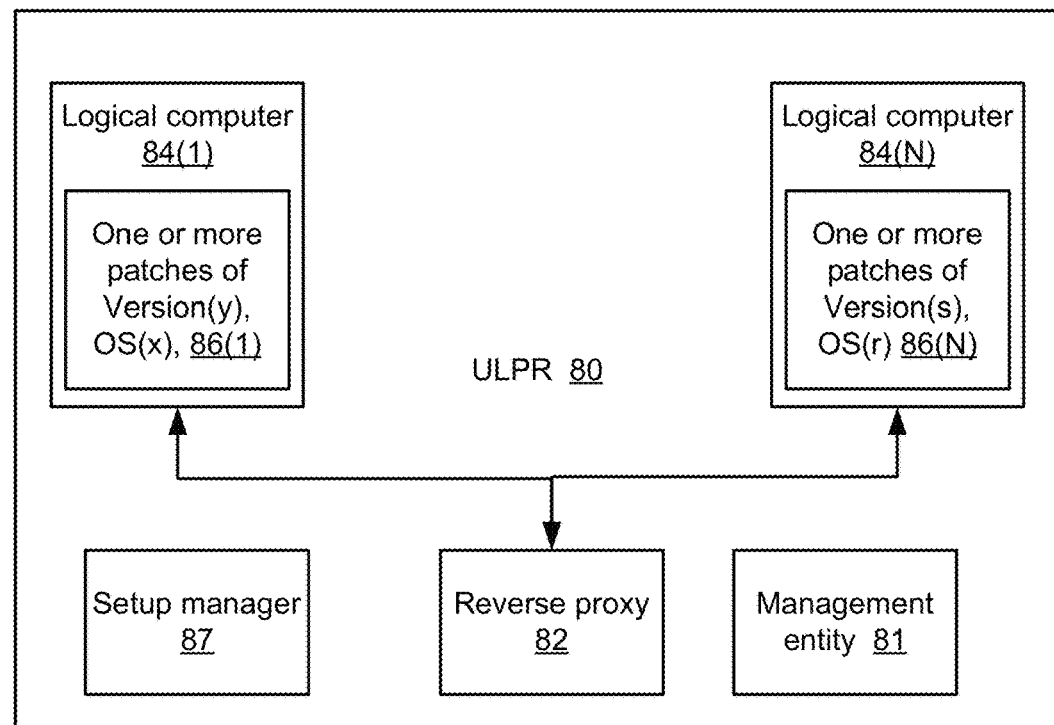
FIG. 6 illustrates an example of a ULPR and its environment.

FIG. 6 illustrate UPLR 80 as including a setup component 87 configured to install the ULPR and set-up the logical computers.

The UPLR may include one or more of the access control manager 85, setup component 87, exposed memory 83, and the like.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer programs may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for software patching, the method comprises:
receiving, by a reverse proxy of a unified local patch repository (ULPR), a request to expose the at least one patch, wherein the request comprises a hostname associated with the selected logical computer, wherein the reverse proxy is running on another logic computer that is a part of the multiple logic computers, the reverse proxy serves as an entry point to incoming requests from the one or more computers;
determining, based on the hostname, to expose at least one patch of a version of an operating system to one or more computers located outside the ULPR, the ULPR is hosted by a computer that differs from the one or more computers; and exposing, for period of time and by the ULPR, a selected logical computer that stores the at least one patch;

wherein the selected logical computer is selected out of multiple logical computers of the ULPR; and wherein different logical computers of the multiple logical computers store operating systems that differ from each other by at least one of identity and version.

2. The method according to claim 1 wherein the determining is executed by a management entity of the ULPR.

3. The method according to claim 1 wherein the determining is executed by a management entity of the ULPR based on at least one patching schedule.

4. The method according to claim 1 wherein the determining is executed by a management entity of the ULPR based on a prediction of patching requirements.

5. The method according to claim 1 wherein the exposing comprises loading the selected logical computer to a memory region that is exposed to the one or more computers.

6. The method according to claim 1, wherein the request further comprises an egress address of the ULPR.

7. The method according to claim 1 comprising downloading, by a setup component hosted by the computer, specific LPR logical computer images required to build one of the multiple logical computer from a vendor's website instead of pre-packaging all LPR images into an installation file.

8. A non-transitory computer readable medium for software patching, the non-transitory computer readable medium stores instructions for:

receiving, by a reverse proxy of a unified local patch repository (ULPR), a request to expose the at least one patch, wherein the request comprises a hostname associated with the selected logical computer, wherein the reverse proxy is running on another logic computer that is a part of the multiple logic computers, the reverse proxy serves as an entry point to incoming requests from the one or more computers;

determining, based on the hostname, to expose at least one patch of a version of an operating system to one or more computers located outside the ULPR, the ULPR is hosted by a computer that differs from the one or more computers; and exposing, for a period of time and by the ULPR, a selected logical computer that stores the at least one patch;

wherein the selected logical computer is selected out of multiple logical computers of the ULPR; and wherein different logical computers of the multiple logical computers store operating systems that differ from each other by at least one of identity and version.

9. The non-transitory computer readable medium according to claim 8 wherein the determining is executed by a management entity of the ULPR.

10. The non-transitory computer readable medium according to claim 8 wherein the determining is executed by a management entity of the ULPR based on at least one patching schedule.

11. The non-transitory computer readable medium according to claim 8 wherein the determining is executed by a management entity of the ULPR based on a prediction of patching requirements.

12. The non-transitory computer readable medium according to claim 8 wherein the exposing comprises loading the selected logical computer to a memory region that is exposed to the one or more computers.

13. The non-transitory computer readable medium according to claim 8 wherein the request further comprises an egress address of the ULPR.

14. The non-transitory computer readable medium according to claim 8 wherein the exposing comprises outputting the selected logical computer from the ULPR.

15. A computer comprising one or more circuits that are configured to:

receiving, by a reverse proxy of a unified local patch repository (ULPR), a request to expose the at least one patch, wherein the request comprises a hostname associated with the selected logical computer, wherein the reverse proxy is running on another logic computer that is a part of the multiple logic computers, the reverse proxy serves as an entry point to incoming requests from the one or more computers; host the ULPR;

determine, based on the hostname, to expose at least one patch of a version of an operating system to one or more computers located outside the ULPR that differ from the computer; and expose, for period of time and by the ULPR, a selected logical computer that stores the at least one patch;

wherein the selected logical computer is selected out of multiple logical computers of the ULPR; and wherein different logical computers of the multiple logical computers store operating systems that differ from each other by at least one of identity and version.

\* \* \* \* \*